April 7, 1970   R. R. CONRAD   3,505,566
GROUND RELAY SYSTEM
Filed Aug. 2, 1967   2 Sheets-Sheet 1
FIG. 1
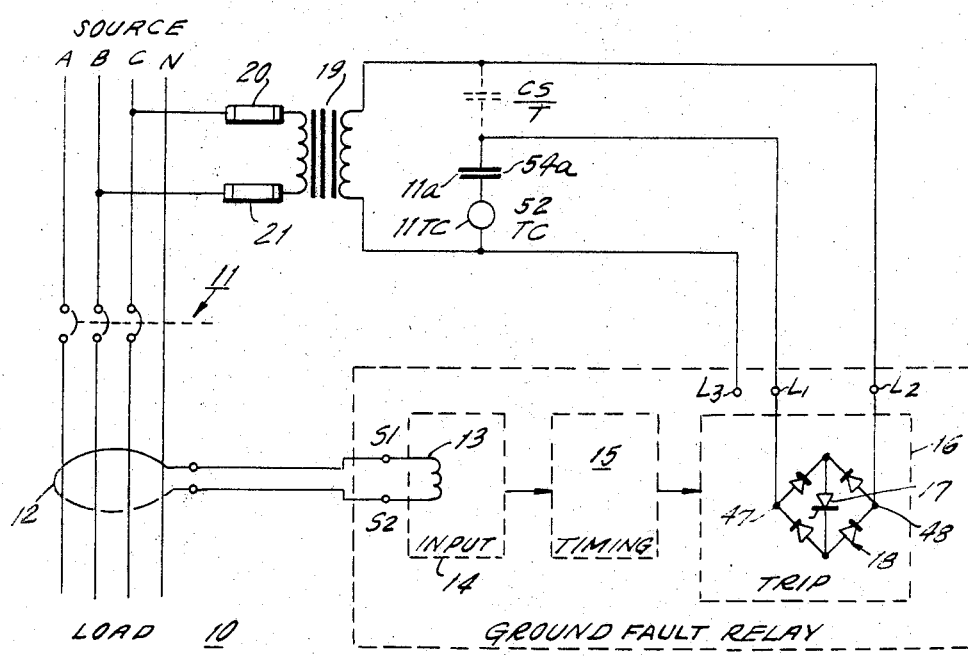
FIG. 2a
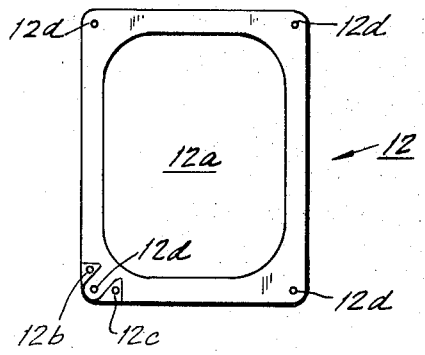
FIG. 2b
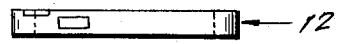
FIG. 3a
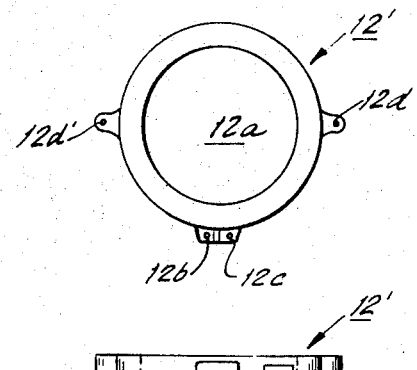
FIG. 3b
INVENTOR
RICHARD R. CONRAD
BY
OSTROLENK, FABER, GERB & SOFFEN
ATTORNEYS April 7, 1970 R. R. CONRAD 3,505,566
GROUND RELAY SYSTEM Filed Aug. 2, 1967 2 Sheets-Sheet 2

INVENTOR.
RICHARD R. CONRAD
BY
OSTROLENK, FABER, GERB & SOFFEN
ATTORNEYS

United States Patent Office 3,505,566
Patented Apr. 7, 1970

3,505,566
GROUND RELAY SYSTEM
Richard R. Conrad, Flourtown, Pa., assignor to I-T-E Imperial Corporation, Philadelphia, Pa., a corporation of Delaware
Filed Aug. 2, 1967, Ser. No. 657,828
Int. Cl. H02h 1/02, 7/00, 1/04
U.S. Cl. 317—18                                    11 Claims

ABSTRACT OF THE DISCLOSURE

This invention teaches a system for indicating the presence of a grounded condition in a three phase system. The three phase system is comprised of four conductors, one for each phase and a neutral conductor which is preferably arranged either within a cable or within a bus duct. Under normal operating conditions, the currents flowing through each phase plus the current flowing through the neutral conductor yields a resultant current of zero.

A sensor, preferably comprised of a special current transformer, surrounds the duct or cable, as the case may be, to perform a sensing operation. When a ground condition exists, ground current will flow in the affected phase and return outside of the sensor via the grounded metal parts so that the sensor will see exactly this current and provide an output signal current proportional to the ground current as determined by the current transformer's turns ratio.

The resultant output current is coupled to a solid state relay which full wave rectifies the output current. The resultant unidirectional current is applied to a timing circuit having at least one capacitor means which charges exponentially at a rate determined by the timing circuit time constant and the applied D.C. voltage level.

When the capacitor voltage reaches a trigger voltage of a predetermined level, a level detector circuit switches from an "off" state to an "on" state, allowing the capacitor to discharge through the switch to develop a gating signal for turning "on" a second switch means. When the second switch means is turned "on," it applies the unidirectional voltage developed by the full wave rectifier to suitable relay means comprising a tripping coil circuit for tripping a three phase circuit breaker coupled to the three phase system to prevent any damage from befalling the three phase system. The elapsed time of the tripping operation is inversely proportional to the magnitude of the short circuit to ground current providing a very short elapsed time for large phase to ground currents and exceedingly greater elapsed time for phase to ground short circuit currents of smaller amplitudes.

The instant invention relates to static relays, and more particularly to a novel combined ground condition sensor and static relay for detecting the presence of a phase to ground short circuit and for operating a three phase circuit breaker tripping coil at a rate which is inversely proportional to the magnitude of the short circuit to ground current.

One type of power distribution system prevalent throughout the world today is a three phase power distribution system comprised of three lines, each carrying one of the three phases, and a neutral conductor which typically may be referred to as a three phase wye-type transmission system. Various arrangements have been conventionally employed for detecting faults in such power distribution systems. It is a primary object of the instant invention to provide a novel arrangement for detecting faults of the type wherein one of the phases has a short circuit path to ground.

The instant invention is comprised of a system for detecting ground conditions in three phase power distribution systems normally comprised of a line for each of the three phases and a neutral conductor. The conductors are typically arranged within a bus duct, all suitably electrically insulated from one another as well as from the bus duct itself. Considering a cross-section of such a configuration, the total currents flowing in the three phases and in the neutral conductor will normally be zero. When a ground condition exists, ground current will flow in the affected phase and return via grounded metal parts at some remote point within the system, yielding a resultant current through the cross-sectional location selected which is other than zero and which reflects the ground current.

The instant invention is comprised of a novel current sensing transformer which is positioned about the bus duct to sense the ground current. In the case where the bus duct has a cross-sectional configuration, the current sensing transformer has a substantially rectangular configuration. In the case where the lines for each of the three phases and a neutral conductor are arranged within a cable configuration, the current sensing transformer has a substantially circular cross-section. The current transformer may be of a single turn. However, greater number of turns may be employed, if desired.

The output of the current transformer is coupled to second transformer means for transforming the output current of the current sensor to a lower current magnitude in accordance with its turns ratio. The output of the second transformer is full wave rectified and applied across an adjustable burden resistance which is set to provide the adjustment for minimum operating current. The voltage appearing across the burden resistor is applied to a timing circuit comprised of at least one capacitor means for charging at a rate inversely proportional to the magnitude of the unidirectional voltage applied thereto.

When the capacitor charges to a voltage of a sufficient magnitude, it causes the triggering of a level detector circuit, causing the circuit to be turned "on," and thereby causing the capacitor to discharge therethrough. Discharging current develops a gating signal to turn a second switch means "on."

The second switch which is in a normally "off" state forms part of a solid state A.C. switching circuit capable of selectively coupling an energy source generating a substantially sinusoidally varying signal to a trip coil for the purpose of initially coupling the trip coil to the power source and sustaining it in the energized state for a period sufficient to cause a tripping operation which thereby terminates connection of the power source to the trip coil within one-half cycle of the frequency rate of the energy source. The solid state switching apparatus energizes the solenoid coil without the need for any mechanical contacts whatsoever during the initiation of energization and terminates connection of the energy source to the solenoid coil either through mechanical or electronic switch means which automatically interrupts connection of the power source to the solenoid coil by providing contacts in a second branch circuit not connected with the solenoid coil branch circuit.

It is therefore one object of the instant invention to provide a novel ground sensing device for use in multiphase power distribution systems and the like wherein means are provided for generating a tripping signal having an inverse time delay relative to the magnitude of the ground fault, wherein ground fault currents of relatively low magnitude cause tripping of a circuit breaker after a substantially long predetermined time delay and wherein ground fault currents of increasing magnitudes result in tripping of the circuit breaker over decreasing time delays.

Another object of the instant invention is to provide a novel ground fault system for sensing ground faults in multiphase power distribution systems and the like comprising a specially designed current sensor for sensing ground fault currents, which sensor is designed to saturate at a predetermined magnitude of ground fault currents to protect the tripping circuit from being damaged.

Still another object of the instant invention is to provide a novel ground fault system for sensing ground faults in multiphase power distribution systems and the like comprising a specially designed current sensor for sensing ground fault currents, which sensor is designed to saturate at a predetermined magnitude of ground fault currents to protect the tripping circuits from being damaged and wherein the ground fault sensing means is further comprised of a timing circuit for triggering tripping of a circuit breaker wherein the time delay of the timing circuit is inversely related to the magnitude of the ground fault current.

Still another object of the instant invention is to provide a novel ground fault system for sensing ground faults in multiphase power distribution systems and the like comprising a specially designed current sensor for sensing ground fault currents, which sensor is designed to saturate at a predetermined magnitude of ground fault currents to protect the tripping circuits from being damaged, wherein the ground fault sensing means is further comprised of a timing circuit for triggering tripping of a circuit breaker, wherein the time delay of the timing circuit is inversely related to the magnitude of the ground fault current and further comprising solid state A.C. switching means normally decoupling a power source from a circuit breaker trip coil and comprising trigger means energized by said timing circuit when said timing circuit achieves a predetermined threshold level for coupling a power source to the circuit breaker trip coil.

Still another object of the instant invention is to provide a novel ground fault system for sensing ground faults in multiphase power distribution systems and the like comprising a specially designed current sensor for sensing ground fault currents, which sensor is designed to saturate at a predetermined magnitude of ground fault currents to protect the tripping circuits from being damaged, wherein the ground fault sensing means is further comprised of a timing circuit for triggering tripping of a circuit breaker wherein the time delay of the timing circuit is inversely related to the magnitude of the ground fault current and further comprising solid state A.C. switching means normally decoupling a power source from a circuit breaker trip coil and comprising trigger means energized by said timing circuit when said timing circuit achieves a predetermined threshold level for coupling a power source to the circuit breaker trip coil and further comprising switch means operated upon the disengagement of said circuit breaker for disconnecting said power source from said circuit breaker trip coil within a time duration of less than one-half cycle of the frequency of the power source.

These and other objects of the instant invention will become apparent when reading the accompanying description and drawings in which:

FIGURE 1 is a simplified schematic diagram embodying the principles of the instant invention.

FIGURES 2a and 2b are top and end views showing one type of current sensor employed with the circuit of FIGURE 1;

FIGURES 3a and 3b are top and end views showing another current sensor which may be employed with the ground sensor of FIGURE 1.

Figure 4:
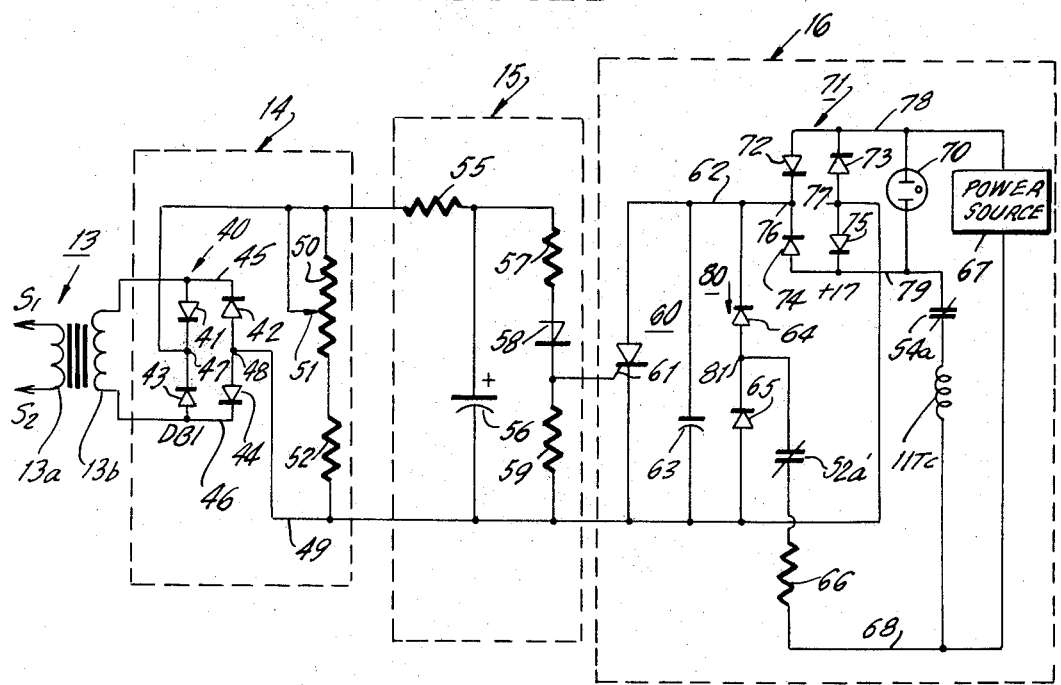
FIGURE 4 is a schematic diagram showing a portion of the ground sensing means of FIGURE 1 in greater detail.

Referring now to the drawings, FIGURE 1 shows a ground sensing system 10 designed in accordance with the principles of the instant invention.

THEORY

As shown in FIGURE 1, there is a three phase power distribution system comprised of three conductors A, B, C for each of the three phases and a neutral conductor N. Each of the three phases A, B, and C are protected against fault conditions by means of a three phase circuit breaker schematically represented by the switch means 11. As is well known in the art, the circuit breaker may be instantaneously tripped when a fault current condition is sensed by suitable sensing means as well as being mechanically operable to the position for maintenance and/or inspection purposes.

As further shown in FIGURE 1, a current transformer or ground sensor 12 is provided which is comprised of a winding of at least one turn encircling the conductors A, B, and C of each phase and the neutral conductor N so as to form a sensing "window" for sensing resultant current flow therethrough. The sensor 12 has a zero output under normal operating conditions since the vector summation of currents in the three phase power distribution network is $I_A+I_B+I_C+I_N=0$. Therefore, there is no resultant current flow through ground sensor 12.

If a fault to ground occurs, the vector summation of $I_A+I_B+I_C+I_N$ is not equal to 0. The resultant current flow through the "window" of sensor 12 is the ground fault current $I_G$. The sensor now has an output $I_G/n=I_S$ where $n$ is the sensor turns ratio and $I_S$ is the secondary current output of sensor 12. Sensor 12 is comprised of a magnetic core which is designed to saturate at a high current level to limit the energy applied to the input of the ground fault protective system static relay.

The output of ground sensor 12 (which generates an output only in the presence of a fault to ground) is coupled to the input terminals of transformer means 13 which has a primary and secondary winding, as can best be seen in FIGURE 4 to be more fully described, and which has a turns ratio such as to reduce the current flowing in its secondary winding. The output current generated in the secondary winding of transformer 13 is applied to an input circuit which, as will be more fully described, full wave rectifies the current generated by transformer 13 and places this current across a variable burden resistor. The ground fault relay is provided with suitable dial means (not shown) to adjust the magnitude of the voltage developed across the variable burden resistor in order to control the value of primary current which causes the static relay to operate and trip the circuit breaker.

When a ground fault condition occurs, the D.C. voltage signal is applied to a timing circuit 15 which is comprised of a resistor-capacitor combination, to be more fully described with respect to FIGURE 4. The voltage across the capacitor component rises exponentially at a rate determined by the circuit time constant and the D.C. signal voltage developed across the variable burden resistor.

When the capacitor voltage reaches the trigger voltage of a level detector circuit (to be more fully described with respect to FIGURE 4) a gate signal is applied to the silicon controlled rectifier 17 of a trip circuit 16 to switch the silicon controlled rectifier 17 to the "on" state. The silicon controlled rectifier, together with a diode bridge network 18 in other peripheral circuitry not shown in FIGURE 1, is the equivalent to a sealed-in contact which holds in, i.e., maintains in the energized state, a circuit breaker trip coil 11TC which remains energized until the circuit breaker opens its normally closed contact $11_a$ which is mechanically linked to the circuit breaker, at which time the solid state relay returns to the "off" state. The relay is universal and can be used equally well on A.C. and D.C. control power sources.

An A.C. source can be taken from the bus supply with a fused, single phase control power transformer 19 having its primary winding coupled to phases B and C through fuses 20 and 21. The power transformer is used to reduce the voltage to a nominal 120 volts A.C. signal. The transformer primary is normally connected line-to-line to assure tripping voltage for ground faults. If the ground fault occurs at the end of a long bus or cable, the circuit impedance limits the ground fault current, and the line-to-neutral voltage of the affected phase at the control-voltage point remains fairly high. This, added to the voltage of the unaffected phase, plus a low-pickup shunt-trip unit in the interrupter, assures the satisfactory tripping supply under all conditions.

If it is desired to maintain full tripping voltage under all fault current conditions a battery supply can be used.

Transient over-voltage protection in the form of a spark gap and capacitor means (to be more fully described with respect to FIGURE 4) is provided to prevent false operation or damage to the static relay by disturbances originating in the ground voltage circuit.

The ground sensor 12 consists of a wound core of small cross-section C (see FIGURES 2a and 2b) with a uniformly distributed secondary winding. The entire assembly is cast in epoxy. The window opening 12a is designed to facilitate installation over flared bus duct terminals, odd bus configurations, and large size of multiple cables as well as flexibility in mounting. The bus duct in many applications is a generally rectangular-shaped conduit containing the phase and neutral conductors which extend therethrough. A bushing 12b having suitable openings 12c is provided for rigidly mounting and securing the output terminals to input terminals of the transformer means 13. The openings 12d at each corner of the current sensor are provided for mechanical support and mounting of the current sensor.

In the case where large diameter cables containing the phase and neutral conductors are employed, the current sensor 12′ of FIGURES 3a and 3b may be employed so as to generally conform to the outer surface of a cable grouping. Inserts (12b, 12c) and bushings 12d are same as FIGURE 2b, only the configurations differ.

FIGURE 4 shows a portion of the ground fault protective system 10 of FIGURE 1 in greater detail. As shown therein, the transformer 13 has the input terminals of its primary windings connected to the output terminals $S_1$ and $S_2$ (see FIGURE 1) of the ground sensor 12. The secondary winding 13b is connected across the common terminals 45 and 46 of the diode bridge network 40 comprised of diodes 41–44, respectively. The output terminals 47 and 48 of the diode bridge network are coupled respectively to the common terminal between adjustable resistor 50 and the timing circuit resistor 55 and the common bus 49. As was previously described, the turns ratio of transformer 13 is such as to reduce the current in the secondary winding 13b relative to the current $I_S$ flowing in the primary winding 13a. Coupled between common terminal 47 and the common bus 49 is a variable burden resistance circuit comprised of a constant resistance 52 and an adjustable resistor 50 having an adjustable arm 51 for controlling the amount of resistance of resistor 50 which is in circuit across the diode bridge network output terminals 47 and 48. The adjustment of adjustable resistor 50 controls the minimum operating current for the circuit. This minimum operating current corresponds to a minimum voltage appearing across the burden resistors 50 and 52. For lower levels of operation adjustable resistor 50 should be adjusted for the highest resistance setting, while higher operating levels require the lowest levels of resistance of adjustable resistor 50.

The D.C. voltage level developed across the composite burden resistance is applied to an R-C timing circuit comprised of resistor and capacitor components 55 and 56 respectively.

The voltage applied to the R-C timing circuit comprised of elements 55 and 56 causes the capacitor 56 to charge in an exponential manner at a rate determined by the circuit's time constant (the ohmic value of resistor 55 multiplied by the capacitance of 56 in farads), and the voltage magnitude of the applied D.C. voltage across the input terminals of the timing circuit.

When the capacitor voltage reaches the trigger voltage of a level detector circuit comprised of a four-layer diode 58, the diode, which is connected in the branch circuit comprised of resistors 57 and 59, switches from the "off" state to the "on" state allowing capacitor 56 to discharge through four-layer diode 58 and resistors 57 and 59 to develop a gating signal of sufficient magnitude and duration to turn "on" silicon controlled rectifier (SCR) 60. It should be noted that the gate electrode 61 of SCR 60 is coupled to the common terminal between four-layer diode 58 and resistor 59. Since the resistance of the four-layer diode 58 may be considered to be negligible upon conduction, resistor 57 is chosen in combination with the gate impedance of SCR 60, which is much less than the value of resistor 59, to control the discharge rate of capacitor 56.

The purpose of SCR 60 is primarily to control the coupling of A.C. power source 67 (which may be the A.C. voltage taken from the phase conductors B and C, as shown in FIGURE 1) to the circuit breaker trip coil 11TC (see both FIGURES 1 and 4). Since a rather detailed description of the solid state (A.C.) switching circuit 16 is set forth in copending U.S. application Ser. No. 673,583, filed Oct. 9, 1967, and assigned to the assignee of the instant invention, a rather simplified description will be given herein.

As can be seen from FIGURE 4, the power source 67 (which may be either an A.C. or a D.C. source as was previously described) has a first or upper terminal connected to a conductor 78 and has a lower terminal connected to conductor 68.

A diode bridge network 71 comprised of diodes 72–75 is arranged so that a common terminal between diodes 72 and 73 is coupled to conductor 78. The common terminal between diodes 74 and 75 is coupled to a conductor 79; a common terminal 76 between diodes 72 and 74 is coupled to conductor 62; and the common terminal 77 between diodes 73 and 75 is coupled to common bus 49.

The anode and cathode electrodes of SCR 60 are coupled across terminals 62, 49 as is capacitor 63 and a diode bridge network 80 comprised of diodes 64 and 65. The common terminal 81 between diodes 64 and 65 is coupled through resistor 66, through conductor 68 which returns to the lower terminal of power source 67. A spark gap tube 70 is coupled between buses 78 and 79 and this spark gap together with capacitor 63 checks the output circuit from transient over-voltages in order to prevent false operation or damage to the relay circuit by disturbances on the control voltage line.

The circuit breaker trip coil 11TC is connected to the lower terminal of power source 67. The upper terminal of the circuit breaker trip coil 11TC is coupled to switch 54a whose other side is connected to conductor 79.

For purposes of establishing a ground relay system, consideration is first given to the protection required. This means low detection levels as noted above, and fast tripping time. Keeping this fact in mind, next consider the coordination and the number of steps required. A minimum of the three steps is required to coordinate load, feeder, and main circuit breakers. The fastest curve should not be less than one (1) cycle even at the highest fault levels to avoid nuisance tripping on transients. The next curve should allow for the first breaker clearing time and some margins. Similarly the third curve would allow for the second breaker plus some margin time.

In view of these requirements the curve type 90 would be difficult to use in a coordinated system.

Curves of the type 92 are ideally suited to the practical situation. Three curves of this type were selected for the preferred embodiment. A curve A was choosen to have a time delay at ten (10) multiples of one (1) cycle, or about 17 msec., in the relatively flat portion of the curve.

Curve B was next established as 100 msec. at then (10) multiples by summation of (1) the time delay of curve A (one cycle) (2) a typical breaker time (two cycles) and (3) a safety margin (three cycles). Similarly curve C was established at 200 msec. at 10 multiples. The flat portion of the characteristic ensures coordination at all fault levels. The inverse region of the curves allows close coordination at low levels, with present phase overloads short time curves when minimum operating current are placed close together.

For purposes of describing the operation of the circuit of FIGURE 4, let it be assumed that no ground fault current exists in this system and therefore, that SCR60 is turned "off." Regardless of whether the power source 67 is an A.C. or D.C. power source, let it first be assumed that, with SCR60 turned "off" conductor 78 is more positive than conductor 79. At this time current will want to flow through diode 72 from conductor 78. However, due to the reverse polarity of diode 74 no current can flow through this path. Due to the reverse polarity of diode 64 and the fact that SCR60 is turned "off" no current can flow through this path. Thus, there is no way of establishing a current path between power source 67 and solenoid trip coil 11TC, or resistor 66.

Let it now be assumed, with SCR60 still turned "off" that conductor 68 is more positive than conductor 78. Current would flow through diode 74, or 64. However, a current path through diode 72 is blocked due to the reverse polarity of this diode and a current path through SCR60 is blocked due to the fact that SCR60 is turned "off." Therefore, power source 67 is disconnected from the circuit breaker trip coil 11TC regardless of the state of the voltage source 67 at any given instant and regardless of the fact that voltage source 67 is either an A.C. or a D.C. source.

Let it now be assumed that a ground fault current is present in the three phase power distribution network being monitored. The current will be developed in ground sensor 12 which is coupled through transformer 13 to diode bridge 40. This alternating current is fullwave rectified, applied across the burden resistor combination 50–52 and applied to the R-C timing circuits 55–56 causing capacitor 56 to charge at a rate controlled by the magnitude of the D.C. voltage applied to the timing circuit and by the R-C time constant of the timing circuit. When the voltage across capacitor 56 reaches a predetermined level, four-layer diode 58 switches "on" developing a voltage drop across resistor 59. This voltage drop will be sufficient to trigger SCR60 to the "on" state.

With SCR60 being turned "on" let it now be assumed that the power source 67 is a 60 cycle A.C. power source. Let it now be assumed that, at the instant SCR60 is turned "on," conductor 78 is more positive than conductor 79. At this time, a first current path will be present through diode 72, SCR60, bus 49, common terminal 77, diode 75, circuit breaker trip coil 11TC and the lower terminal of power source 67. Simultaneously therewith a second branch circuit which will pass current exists from the cathode of SCR60 through bus 49, diode 65, resistor 66 and conductor 68 to the bottom terminal of power source 67. Since the load branch circuit comprised of the circuit breaker trip coil 11TC is primarily inductive reactance and since the branch circuit comprised of resistor 66 is substantially purely resistive, the A.C. currents flowing through these branch circuits will be out of phase with one another. Since both the currents of both branch circuits pass through SCR60, the current through SCR60 will always be positive and will always be greater than zero, thereby preventing the SCR from being turned "off" so as to constantly supply power from power source 67 to the circuit breaker trip coil 11TC.

The trip coil may be decoupled from power source 67 in the following manner:

Energization of the trip coil causes the circuit breaker 11 to be tripped to open-circuit the three phase power distribution network. Tripping to the disengaged position is mechanically linked to the normally closed circuit breaker contact 52a (see both FIGURES 1 and 2). This contact, which is normally closed, will open, thereby opening the current path in the load branch circuit including the trip coil 11TC thereby disconnecting the power source from the load branch circuit.

As a second alternative, the normally closed contacts 52a may be placed in the branch circuit comprising resistor 66. In same manner as was previously described, the tripping of the circuit breaker 11 will open the normally closed contact pair 52a' connected in series with resistor 66. This will immediately terminate the purely resistive branch current leaving only an inductive branch current flowing in the circuit. When this current flows through zero reference level, the voltage across the anode and cathode electrodes of SCR60 will drop to zero causing the SCR to be turned "off," thereby terminating the flow of power from power source 67 to the circuit breaker trip coil 11TC. This action will occur during an elapse time no greater than one-half cycle of the frequency of power source 67.

Regardless of whether the circuit breaker contact 52a is placed in the load branch circuit or in the branch circuit comprising resistor 66 (see normally closed contact 52a') the de-energization of the circuit breaker trip coil will occur only after the circuit breaker 11 has successfully been tripped, there being no further need for power to be coupled to the circuit breaker trip coil. As still another feature, if power is derived from the multiphase power network being protected, the tripping of circuit breaker 11 to the fully open position will decouple power from the circuit breaker trip coil 11TC if the coupling between the three phase power network and transformer 19 is placed between the circuit breaker 11 and the load. However, it is more advantageous to couple the line-to-line voltage to transformer 19 in the manner shown in FIGURE 1.

Figure 5:
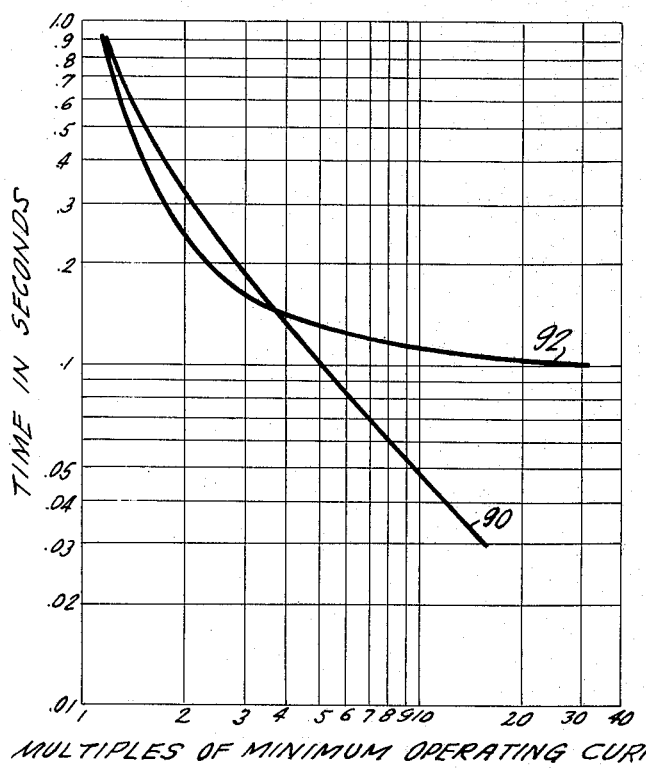

The time-current characteristic curves for the ground fault protective system of FIGURES 1 and 4 are shown in FIGURE 5 wherein the curves 90–92 are shown as being plotted in log-log scale wherein the vertical axis represents elapsed time in seconds and wherein the horizontal axis represents multiples of base rating. Curve 90 shows the typical response of the circuit of FIGURES 1 and 4 for a ground fault which generates a linear input signal to the relay circuit, i.e., no saturation in 13. Curve 92 shows the response of the ground fault protective circuit when employing saturation in transformer 13.

Curves 90 and 92 may be adjusted in their position vertically (time) by adjustment of the time constant of resistor 55 and capacitor 56. The one (1) value of the "minimum operating current" is determined by the setting of resistor 50.

Insofar as minimum operating current is concerned, the ground relay pickup setting is continuously adjustable, in one preferred embodiment, between 200 and 2000 primary amperes.

Insofar as the ground sensors of FIGURES 2a–2b and 3a–3b are concerned, the dimensions of the window of sensor 12, shown in FIGURES 2a–2b may vary from $L=12$ to 28"; H varies from 8–16" and the cross-sectional thickness T and W are both typically 1".

In the embodiment of FIGURES 3a–3b, the inner diameter ID may vary in the range from 5"–8" with the thickness in width of the sensor D and W respectively, each being 1". Obviously, ground sensors of other varying dimensions may be employed depending only upon the needs of the user.

It can clearly be seen from the foregoing that the instant invention provides a novel ground fault protective system capable of detecting ground fault currents in multiphase power distribution networks wherein faults in such systems are cleared by automatically tripping a multiphase circuit breaker provided in the power distribution network, which circuit breaker is tripped after an elapsed time which is inversely proportional to the magnitude of the fault. Tripping energy necessary for tripping the circuit breaker may be taken directly from the power distribution network itself without the need for supplying an external triggering power source. A novel solid state switching circuit is provided which is triggered by a timing circuit providing the desired time-current characteristic for the circuit response which is capable of being "sealed-in" until successful tripping of the circuit breaker has taken place.

Although there has been described a preferred embodiment of this novel invention, many variations and modifications will now be apparent to those skilled in the art.

The embodiments of the invention in which an exclusive privilege or property is claimed are defined as follows:

1. A system for detecting ground faults in multiphase power distribution networks protected by a multiphase circuit breaker having a trip coil, said network having phase and neutral conductors; said system comprising:
   first sensor means inductively coupled to all of said conductors for generating a current only upon the occurrence of a ground fault;
   second full wave rectification means having pairs of input and output terminals;
   third means coupling said first sensor means to the input terminals of said second means to enable said second means to generate a direct voltage representative of said first means generated current;
   an adjustable burden resistance circuit coupled across the output terminals of said second means for controlling the magnitude of direct voltage generated by said second means and the sensitivity to which said system responds to ground faults of varying severity;
   fourth timing circuit means coupled across said burden resistance circuit and including a time constant network for generating an output voltage of a magnitude substantially equal to that generated by said second means after a time delay dependent upon the magnitude of voltage generated by said means and upon said time constant network;
   fifth normally "off" switch means coupled to said timing circuit for being turned "on" when the output voltage of said timing circuit achieves a predetermined threshold level;
   a source of power;
   sixth solid state switching circuit means coupled to said switch means for selectively coupling said power source to said circuit breaker trip coil when said fifth switch means is turned "on."

2. The system of claim 1 wherein said power source is an alternating current source derived directly from the power distribution network being protected.

3. The system of claim 1 wherein said first sensor means is comprised of a coil of at least one turn surrounding all of said conductors and electrically insulated from said conductors.

4. The system of claim 3 wherein said third means is comprised of transformer means having primary and secondary windings respectively coupled to said first and second means;
   said transformer means having a saturable magnetic core to limit the output energy in said second winding.

5. The system of claim 1 wherein said sixth means is comprised of a diode bridge network having a first pair of terminals coupled between said power source and said trip coil and including two pairs of serially connected, oppositely poled diodes between said first pair of terminals, said network also have a second pair of terminals;
   a semiconductor switching device having a pair of terminals and a control terminal, said device being coupled across the second pair of terminals of said diode bridge network and arranged to conduct current therebetween when operative;
   said control terminal being coupled to the output of said fifth means;
   a second diode network having two terminals coupled across said semiconductor switch and a common terminal;
   a pair of similarly poled diodes being serially connected between said two terminals and said common terminal; and
   impedance means coupled between said common terminal and said power source whereby all current flow from said power source is prevented while said switching device is in a non-conductive condition.

6. The system of claim 5 further comprising normally "closed" switch means coupled in series with said trip coil and being connected with said circuit breaker to "open" when said circuit breaker has tripped to turn off said semiconductor switch.

7. The system of claim 5 wherein said semiconductor switching device is a silicon controlled rectifier.

8. The system of claim 5 wherein said power source is comprised of third transformer means coupled between two phase conductors of said power distribution network and said sixth means.

9. The system of claim 5 further comprising spark gap means coupled across the first pair of terminals of said diode bridge network to prevent transient voltages from affecting circuit operation.

10. The system of claim 7 further comprising capacitance means coupled across said silicon controlled rectifier to prevent transient voltages from affecting circuit operation.

11. The system of claim 5 wherein the impedance of said impedance means is selected so as to cause an A.C. current passing therethrough to be out of phase with the circuit passing through said trip coil, said impedance means being primarily resistive.

References Cited
UNITED STATES PATENTS
3,213,321 10/1965 Dalziel _____ 317—18
3,259,802 7/1966 Steen _____ 317—18

LEE T. HIX, Primary Examiner

J. D. TRAMMELL, Assistant Examiner

U.S. Cl. X.R.

317—27, 33, 36, 49